United States Patent
Fuchiwaki

(10) Patent No.: US 7,768,887 B2
(45) Date of Patent: Aug. 3, 2010

(54) INFORMATION RECORDING/REPRODUCING APPARATUS AND UPDATING METHOD OF MANAGEMENT INFORMATION FOR OPTICAL DISK MEDIUM

(75) Inventor: Atsushi Fuchiwaki, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 836 days.

(21) Appl. No.: 11/513,366

(22) Filed: Aug. 31, 2006

(65) Prior Publication Data

US 2007/0171797 A1    Jul. 26, 2007

(30) Foreign Application Priority Data

Jan. 25, 2006   (JP)  ............................. 2006-015949

(51) Int. Cl.
*G11B 20/18*    (2006.01)
*G11B 7/00*    (2006.01)
*G11B 20/10*    (2006.01)

(52) U.S. Cl. ............... 369/53.16; 369/53.35; 369/47.38

(58) Field of Classification Search .............. 369/47.38, 369/53.16, 53.35
See application file for complete search history.

(56) References Cited

U.S. PATENT DOCUMENTS 6,526,522 B1 *   2/2003   Park et al. ...................... 714/8
6,671,243 B2 *   12/2003   Ando et al. ................. 369/59.1
6,674,697 B1 *   1/2004   Ko ........................... 369/47.14

FOREIGN PATENT DOCUMENTS

JP    2002-245723    8/2002
JP    2004-14088    1/2004

* cited by examiner

*Primary Examiner*—Andrea L Wellington
*Assistant Examiner*—Aneeta Yodichkas
(74) *Attorney, Agent, or Firm*—Antonelli, Terry, Stout & Kraus, LLP.

(57) ABSTRACT

When user data fails to be recorded in an address of a user data area, the same data is recorded in an address of a spare area. Information indicating that the data for the address of the user data area is recorded in the address of the spare area is registered in a DL that is loaded in a buffer memory, and the information is recorded in a currently-valid DL area of DMA1. As similar thereto, the information is recorded in a currently-valid DL area of DMA2. If the recording fails, the DL is alternatively recorded in another DL area of the same DMA2. Thereafter, DDSs of DMA2 are deleted, and then, without changing information of the number of times of updating the DDSs, only the staring address of the DL of the DDSs is updated. According to the updating method, it is possible to shorten the time required for updating management information of a medium in an information recording/reproducing apparatus. In addition, it is possible to reduce the number of times of updating management information of an optical disk medium.

5 Claims, 6 Drawing Sheets

FIG. 4

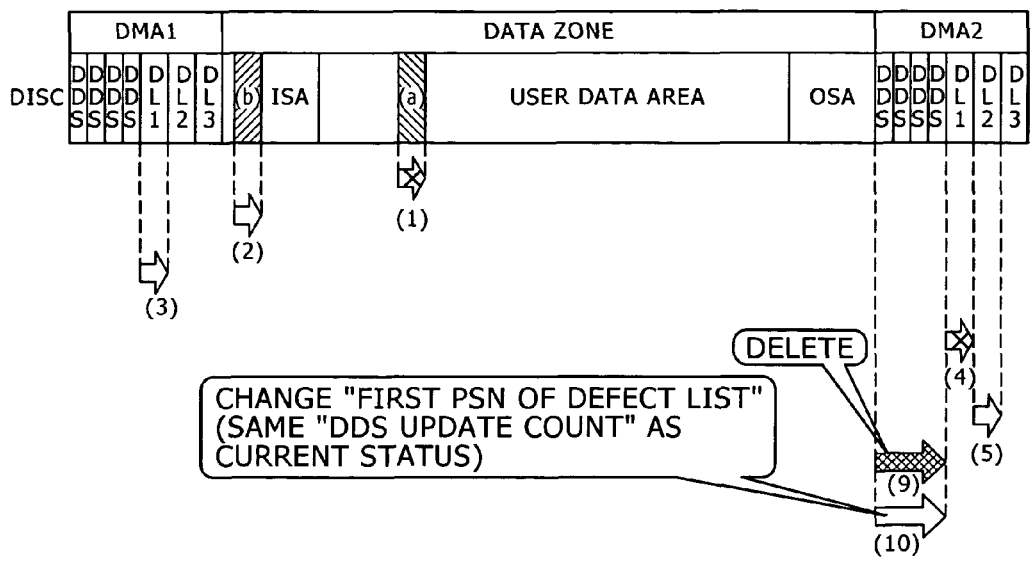

FIG. 5

DDS

| DATA FRAME | BYTE POSITION IN DATA FRAME | CONTENTS | NUMBER OF BYTES |
|---|---|---|---|
| 0 | 0 | DDS INDENTIFIER="DS" | 2 |
| | 2 | DDS FORMAT=00H | 1 |
| | 3 | RESERVED AND SET TO 00H | 1 |
| | 4 | DDS UP DATA COUNT | 4 |
| | 8 | RESERVED AND SET TO 00H | 8 |
| | 16 | FIRST PSN OF DRIVE AREA | 4 |
| | 20 | RESERVED AND SET TO 00H | 4 |
| | 24 | FIRSE PSN OF DEFECT LIST | 4 |
| | 28 | RESERVED AND SET TO 00H | 4 |
| | 32 | LOCATION OF LSN 0 OF USER DATA AREA | 4 |
| | 36 | LAST LSN OF USER DATA AREA | 4 |
| | 40 | INNER SPARE AREA SIZE | 4 |
| | 44 | OUTER SPARE AREA SIZE | 4 |
| | 48 | RESERVED AND SET TO 00H | 4 |
| | 52 | SPARE AREA FULL FLAGS | 1 |
| | 53 | RESERVED AND SET TO 00H | 1 |
| | 54 | DISC CERTIFICATION FLAGS | 1 |
| | 55 | RESERVED AND SET TO 00H | 1 |
| | 56 | LAST VARIFIED ADDRESS POINTER | 4 |
| | 60 | RESERVED AND SET TO 00H | 1988 |
| 1 | 0 | RESERVED AND SET TO 00H | 2048 |
| ⋮ | ⋮ | ⋮ | ⋮ |
| 31 | 0 | RESERVED AND SET TO 00H | 2048 |

| CLUSTER NUMBER /DATA FRAME | BYTE POSITION IN DATA FRAME | CONTENTS | NUMBER OF BYTES |
|---|---|---|---|
| 0/0 | 0 | DEFECT LIST HEADER | 64 |
| 0/0 : 0/31 | 64 | LIST OF DEFECTS | 65472 |
| 1/0 : 1/31 | 0 | LIST OF DEFECTS | 65536 |
| 2/0 : 2/31 | 0 | LIST OF DEFECTS | 65536 |
| 3/0 : : : 3/31 | 0 | LIST OF DEFECTS | n×8 |
| | n×8 | DEFECT LISRT TERMINATOR | 8 |
| | (n+1)×8 | RESERVED AND SET TO 00H | ... |

FIG. 7

DL CONTENTS

| BYTE | 0 | 1 | 2 | 3 | 4 | 5 | 6 | 7 |
|---|---|---|---|---|---|---|---|---|
| BIT | 7..4 3..0 | 7......0 | 7......0 | 7......0 | 7..4 3..0 | 7......0 | 7......0 | 7......0 |

| STATUS 1 | DETECTIVE CLUSTER FIRST PSN | STATUS 2 | REPLACEMENT CLUSTER FIRST PSN |

INFORMATION RECORDING/REPRODUCING APPARATUS AND UPDATING METHOD OF MANAGEMENT INFORMATION FOR OPTICAL DISK MEDIUM

BACKGROUND OF THE INVENTION

1. Field of the Invention

The present invention relates to an information recording/reproducing apparatus using a recording medium such as a high-density optical disk, and an updating method of management information for an optical disk medium.

2. Description of the Related Art

In order to deal with increased density of an optical disk, highly-reliable management of a medium has been required. Defect management information that shows, for each loaded optical disk, at which position a defect is present on a disk and at which position a spare area for the defect position is present on the disk is essential information when recording or reproducing information. Values of various conditions, for example, a recording power and the like at the time of recording and reproducing information on/from a loaded optical disk are stored, and the stored values are read and set at the time of starting a recording/reproducing operation, thereby improving the efficiency in setup of the operation. Defect management areas (hereinafter, abbreviated as DMAs) are provided at plural areas on a disk so that the defect management information is multi-recorded in each area.

For example, a DVD-RAM disk has four defect management areas (DMA1 to DMA2) provided thereon, and two of which are arranged on the inner circumferential side of the optical disk and the other two of which are arranged on the outer circumferential side of the optical disk (For example, Japanese Patent Application Laid-Open No. 2002-245723).

In a case of a high-density disk with large-capacity that is called a DVR (Data and Video Recording), two defect management areas (DMA1, DMA2) on the inner circumferential side of the disk are arranged so as to be separated from each other in the radius direction of the disk while sandwiching a test writing area (Optimum Power Control Area). With this arrangement, the two defect management areas (DMA1, DMA2) are prevented from being damaged at the same time due to a defect, a flaw and the like, thereby improving the reliability of the DMA. Further, in the case where the number of times of updates is recorded in a DDS (Disc Definition Structure) of the defect management area and the number reaches a threshold limit of the number of times of overwrites, the recording area of the defect management information is changed, thereby increasing the reliability of recording/reproducing information on/from the DMA. The number of times of updates stored in the DDSs are compared with each other so as to determine which DMA data is valid (For example, Japanese Patent Application Laid-Open No. 2004-14088).

SUMMARY OF THE INVENTION

For a high-density disk having plural defect management areas (DMA1 to DMA4) provided thereon, these pieces of information are sequentially read to determine which information is valid information (updated information) by comparing the respective pieces of read data with each other. Accordingly, on the basis of the information determined as valid information, a setup process for a recording/reproducing operation is performed. In the case of the high-density disk, management information is increased, and in addition, increased information areas are separately arranged on the inner circumferential side (read in) and on the outer circumferential side (read out) of the disk. Therefore, it is necessary for a reading pickup to move, or travel back and forth in some cases, between the respective areas. Since the pickup has the limit in its moving speed, there is a problem that the time required for reading information is increased and the setup time is accordingly increased. Especially when a defect list (DL) fails to be recorded in an existing DL area at the time of updating the DL of a DMA and the DL is accordingly recorded in a spare DL area, it is necessary to update each disc definition structure (DDS) of all the DMAs (DMA1 to DMA4), and as a result, a large time loss is incurred. Further, since the number of times of updates is increased, the rewriting capacity of the disk is wasted.

An object of the present invention is to shorten the time required for updating management information of a medium in an information recording/reproducing apparatus.

Another object of the present invention is to reduce the number of times of updating management information of an optical disk medium.

In order to achieve the above former object, an information recording/reproducing apparatus of the present invention includes: a spindle motor for rotating an optical disk medium on which management information is recorded in each of plural areas that are separately arranged in a radius direction, the management information including a defect list composed of defect position information and spare position information, and a disc definition structure composed of starting position information of the defect list and information of the-number-of-times-of-updates; a pickup for recording, reproducing or deleting information on the optical disk medium; a recording/reproducing/deleting circuit for processing a recording signal and a deleting signal that are supplied to the pickup and for processing a reproduced signal from the pickup; a servo circuit for controlling rotation of the spindle motor and movement of the pickup; a memory for storing recording information that is supplied to the recording/reproducing/deleting circuit and for storing reproduced information that is processed by the recording/reproducing/deleting circuit; and a microprocessor for controlling the servo circuit and the recording/reproducing/deleting circuit, wherein when information fails to be recorded on the optical disk medium and a replacement process is performed; and the defect list of first management information that is recorded on an inner circumferential side of the optical disk medium is updated and then the defect list of second management information that is recorded on an outer circumferential side than the first management information fails to be updated so as to perform the replacement process, the disc definition structure of the second management information is deleted, and the starting position information of the defect list included in the disc definition structure of the second management information is changed for update.

The updated information of the-number-of-times-of-updates included in the disc definition structure of the second management information is the same as that in the last time.

When the starting position information of the defect list is changed, the starting position information of the defect list included in the disc definition structure of the second management information that is stored in the memory is changed, and when the disc definition structure of the second management information is updated, the disc definition structure of the second management information on the optical disk medium is updated on the basis of the changed disc definition structure of the second management information stored in the memory.

When the defect list of the first management information fails to be updated and the replacement process is performed, the disc definition structure of the first management information is deleted before updating the defect list of the second management information, and the starting position information of the defect list included in the disc definition structure of the first management information is changed for update.

The updated information of the-number-of-times-of-updates included in the disc definition structure of each of the first management information and the second management information is the same as that in the last time.

In order to achieve the above latter object, an updating method of management information for an optical disk medium, of the present invention, on which management information is recorded in each of plural areas that are separately arranged in a radius direction, the management information including a defect list composed of defect position information and spare position information, and a disc definition structure composed of starting position information of the defect list and information of the-number-of-times-of-updates, includes the steps of: storing, after plural pieces of management information for the optical disk medium are reproduced, the reproduced information; performing, when information fails to be recorded on the optical disk medium, a replacement process for recording the same information in a spare area; updating the defect list of first management information that is recorded on an inner circumferential side of the optical disk medium; changing the starting position information of the defect list included in the disc definition structure of the second management information that is stored in the memory when the defect list of second management information that is recorded on an outer circumferential side than the first management information of the optical disk medium fails to be updated and the replacement process is performed; deleting the disc definition structure of the second management information of the optical disk medium; and recording the updated disc definition structure of the second management information, which is stored in the memory, on the optical disk medium.

The updated information of the-number-of-times-of-updates, which is recorded on the optical disk medium, included in the disc definition structure of the second management information is the same as that in the last time.

The updating method of management information for an optical disk medium further includes, prior to updating the defect list of the second management information when the defect list of the first management information fails to be updated, the steps of: performing the replacement process for the defect list of the first management information; changing the starting position information of the defect list included in the disc definition structure of the first management information that is stored in the memory; deleting the disc definition structure of the first management information of the optical disk medium; and recording the updated disc definition structure of the first management information, which is stored in the memory, on the optical disk medium.

The updated information of the-number-of-times-of-updates, which is recorded on the optical disk medium, included in the disc definition structure of each of the first management information and the second management information is the same as that in the last time.

According to the present invention, it is possible to shorten the time required for updating management information of a medium in an information recording/reproducing apparatus. In addition, it is possible to reduce the number of times of updating management information of an optical disk medium.

BRIEF DESCRIPTION OF THE DRAWINGS

FIG. 4 is a diagram showing an outline of a DL updating process according to the embodiment;

FIG. 5 is a diagram showing medium management information contained in a DDS in FIG. 4;

FIG. 6 is a diagram showing a configuration of DLs (DL1 to DL3) in FIG. 4;

FIG. 7 is a diagram showing the contents (an original address and a spare address) registered in the DLs in FIG. 6;

DETAILED DESCRIPTION OF THE PREFERRED EMBODIMENTS

Hereinafter, an embodiment of the present invention will be described in detail with reference to the drawings.

Figure 1:
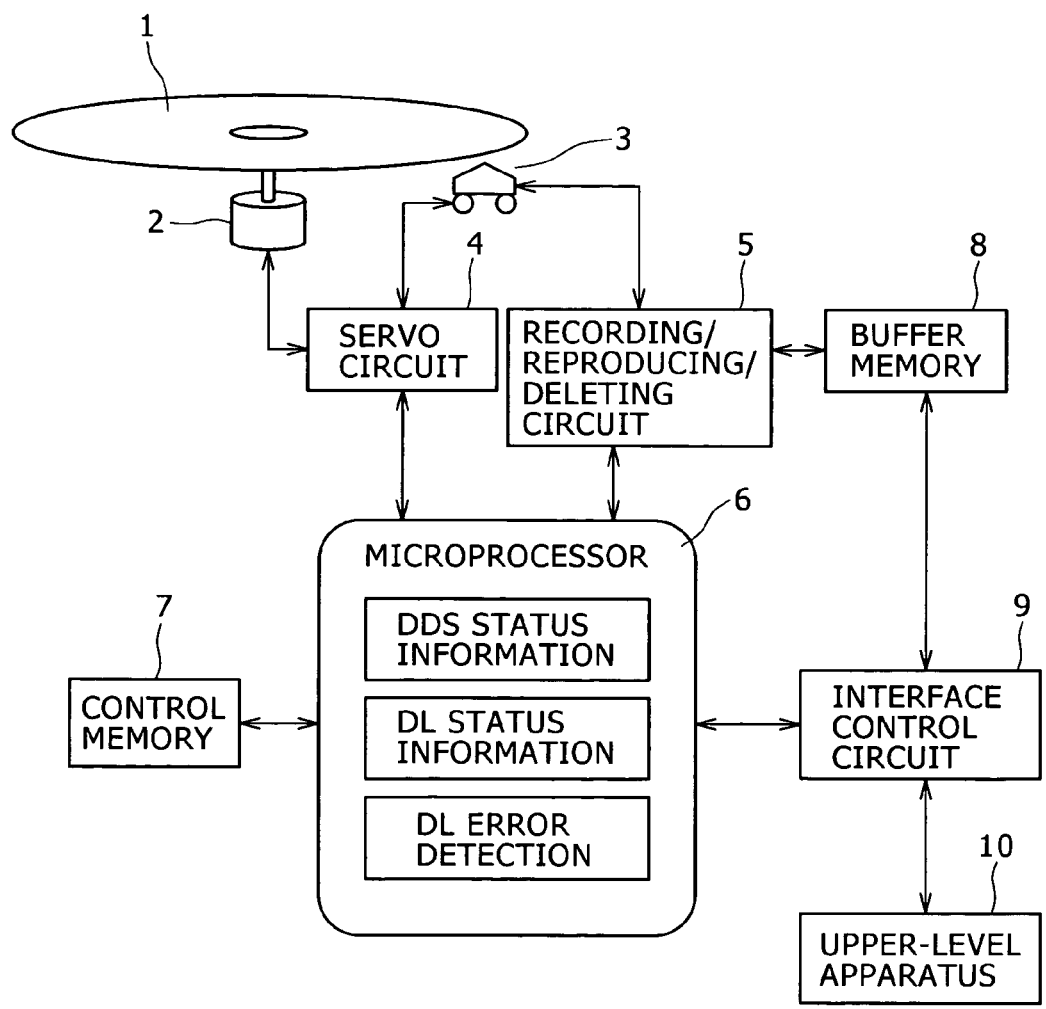
FIG. 1 is a diagram showing a block configuration of an optical disk apparatus that is an embodiment of an information recording/reproducing apparatus according to the present invention.

FIG. 1 is a diagram showing a block configuration of an optical disk apparatus that is an embodiment of an information recording/reproducing apparatus according to the present invention. An optical disk 1 as a recording/reproducing medium is rotated at a predetermined rotational speed by a spindle motor 2. A pickup 3 includes a laser light source, a photodetector, and an optical lens system, and irradiates a laser beam onto the optical disk 1 so as to record and reproduce information. A servo circuit 4 controls the rotation of the spindle motor 2 and the position of the pickup 3 in the radius direction and in the vertical direction of the disk so as to control tracking and focus. A recording/reproducing/deleting circuit 5 performs a recording process such as modulation and compensation for a recording signal supplied to the pickup 3, a reproducing process such as digitalization, demodulation, decoding, and error correction with respect to a signal read by the pickup 3, and a process for a deleting signal supplied to the pickup 3. Data to be recorded and reproduced is temporarily stored in a buffer memory 8, and is transmitted and received between the buffer memory 8 and an upper-level apparatus 10 (e.g., a personal computer), which is connected to the outside, through an interface control circuit 9. On receiving a command from the upper-level apparatus 10, a microprocessor 6 controls the servo circuit 4, the recording/reproducing/deleting circuit 5, and the interface control circuit 9 so as to control respective processes such as recording/reproducing/deleting operations. A control memory 7 stores therein a program and data necessary for the control.

When starting a recording/reproducing operation, the pickup 3 accesses (performs a seek operation) management information recording areas such as DMAs, which are provided on the inner circumferential side and on the outer circumferential side on the optical disk 1, so as to obtain management information. The microprocessor 6 controls a sequence with which the pickup 3 gains an access, and sets up the apparatus in a recording/reproducing condition, which is suitable for the loaded optical disk, on the basis of the obtained management information. Further, the microprocessor 6 obtains DDS status information from the obtained management information, and manages an updated DDS (disc definition structure). Furthermore, the microprocessor 6 obtains DL status information to manage a currently-valid DL (defect list), and performs a DL error detection process for detecting a failure of recording a DL in an existing DL area when updating the DL. It should be noted that, other than the microprocessor 6, the DL error detection may be performed by providing a DL error detection circuit so that a result of the detection can be reported to the microprocessor 6.

Figure 2:
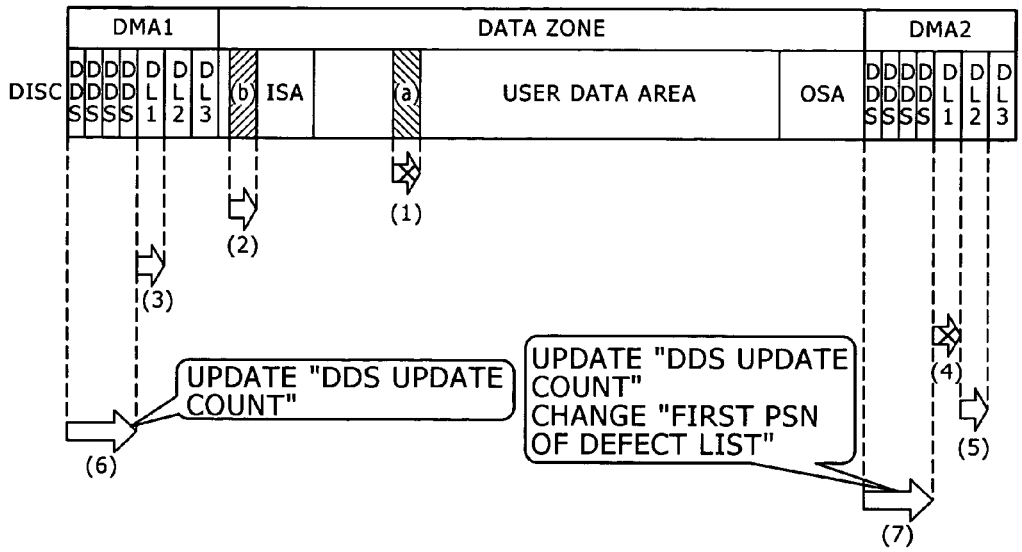
FIG. 2 is a diagram showing an area structure and an outline of an example of a DL updating process of a high-density rewritable optical disk used in the embodiment.

With reference to FIG. 2, an explanation will be given to an example of an area structure of the high-density rewritable optical disk 1 used in the embodiment. For the purpose of a simple explanation, the area structure in FIG. 2 shows only areas in which a disc definition structure relating to the present invention is recorded, and the other areas in which the other management information is recorded are omitted. The optical disk 1 has DMA1 in which DDSs and DLs are recorded and DMA2 in which DDSs and DLs are recorded on the inner circumferential side and the outer circumferential side, respectively. The optical disk 1 also has in the middle a data zone in which user data and the like are recorded. DMA1 has four DDSs and three DLs (DL1 to DL3) provided therein, and DMA2 also has four DDSs and three DLs (DL1 to DL3) provided therein. The data zone has a user data area, a spare area (ISA) on the inner circumferential side, and a spare area (OSA) on the outer circumferential side. For the purpose of a simple explanation, one DMA is provided on each of the inner circumferential side and the outer circumferential side in FIG. 2. On an actual optical disk, two DMAs are provided on each of the inner circumferential side and the outer circumferential side. The number of DLs is set to three, however, the number may be optionally determined.

FIGS. 5, 6 and 7 respectively show structures of the DDS, DL, and DL contents all of which are standardized in BD-RE (Blu-ray Disc Recording) that is a high-density rewritable optical disk. The DDS shown in FIG. 5 manages information valid only for the involved DMA and information common to the other DMAs. The information valid only for the involved DMA is indicated by "DDS update count" at the byte position 4 and "first PSN of defect list" at the byte position 24. "DDS update count" at the byte position 4 is information of the-number-of-times-of-updates representing the number of times of updating DDSs, and "first PSN of defect list" at the byte position 24 is starting position information of a defect list representing the starting address thereof. The DL shown in FIG. 6 contains plural areas (list of defects) in which the contents of defect lists are recorded. The contents (DL contents) of the list of defects show, as shown in FIG. 7, position information (defective cluster first PSN) of an area that is replaced due to a defect and position information (replacement cluster first PSN) of a replacement area.

Figure 3:
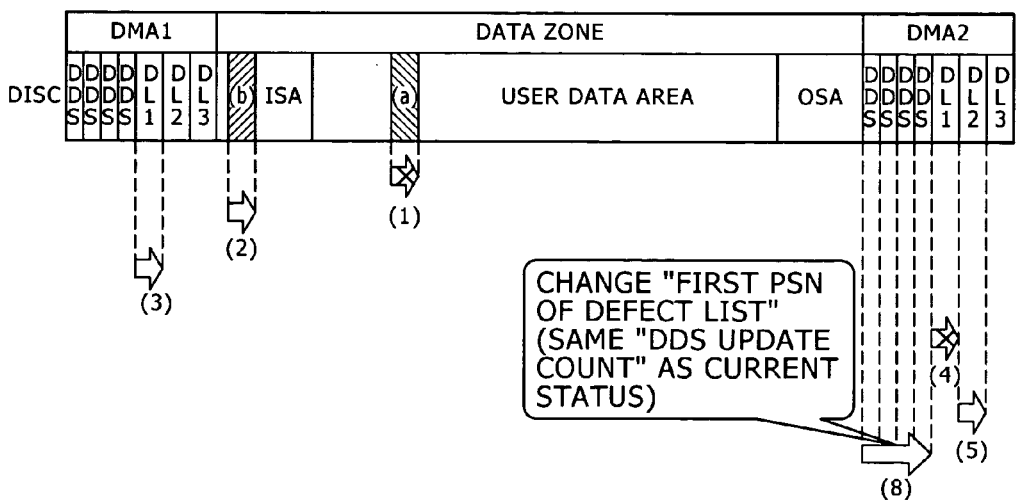
FIG. 3 is a diagram showing an outline of another example of the DL updating process.

Next, an updating method of a disc definition structure according to the embodiment will be described with reference to FIGS. 2, 3, and 4. In the BD-RE standard, when a DL fails to be recorded in an existing DL area at the time of updating the DL and the DL is accordingly recorded in a spare DL area, the DDSs of all the DMAs need to be updated. As shown in FIG. 2, when user data fails to be recorded in an address (a) of the user data area (1), the same data is recorded in an address (b) of the spare area (ISA in this case) (2). Information indicating that the data for the address (a) is recorded in the address (b) is registered in a DL that is loaded in the buffer memory 8, and the information is recorded in a currently-valid DL area (it is assumed that DL1 is valid in this case) of DMA1 (3). As similar thereto, the information is recorded in a currently-valid DL area (it is assumed that DL1 is valid in this case) of DMA2. If the recording fails (4), the DL area is replaced by another DL area (DL2 in this case) of the same DMA2 to record the DL (5). Since the valid DL of DMA2 is changed from DL1 to DL2, the starting address "first PSN of defect list" of the valid DL that is managed in the DDSs needs to be updated. In order to update the information of the DDSs, information of "DDS update count" of the DDS that is loaded in the buffer memory 8 is updated (1 is added), all of the four DDSs of DMA1 are updated (recorded) (6), and then each information of "DDS update count" and "first PSN of defect list" of the four DDSs of DMA2 is updated (recorded) (7).

As described above, when the starting address of the DL is changed, the information of "first PSN of defect list" is normally the unique information valid only for the DMA (DMA2 in the above case) in the DDSs. Accordingly, it is desirable that, as shown in FIG. 3, without updating the information of "DDS update count", only the information of "first PSN of defect list" of the DDSs of DMA2 be updated (8). Such a scheme eliminates the need of updating the DDSs of another DMA (DMA1 in the above case). Thus, the number of times of updating the DDSs that have no spare area can be reduced, which results in unwasted consumption of the rewriting capacity of the disk and reduction in time for updating another DMA (time required for moving between the inner-most circumference and the outer-most circumference). However, in the method shown in FIG. 3, when the power of the optical disk apparatus is turned off during the execution of the process (8), the values of "DDS update count" are the same, but other pieces of information ("first PSN of defect list" in this case) are different from each other, in the DDS recorded on the disc. Thus, there is a possibility of producing such a disk that violates (is not consistent with) the standard. Invalid "first PSN of defect list" is possibly read from such a disk, which possibly results in abnormal operations of the optical disk apparatus.

For that reason, as shown in FIG. 4, the DDSs of DMA2 are once deleted (9), and without updating the information of "DDS update count", only the information of "first PSN of defect list" of the DDSs is updated (10). Thus, even when the power is turned off in the middle of the updating process (10) for the DDSs, the DDSs of the other DMA need not be updated without producing such a disk that violates the standard, on which the values of "DDS update count" are the same, but the pieces of information of "first PSN of defect list" are different from each other. Thus, the number of times of updating the DDSs can be reduced and the time required for updating the DDSs can be shortened. Further, in a case of a phase-change optical disk that is a rewritable medium, a laser power required for the deleting process (9) is as low as about one tenth of that required for recording, and thus wasting of the rewriting capacity of the disk can be reduced.

Figure 8:
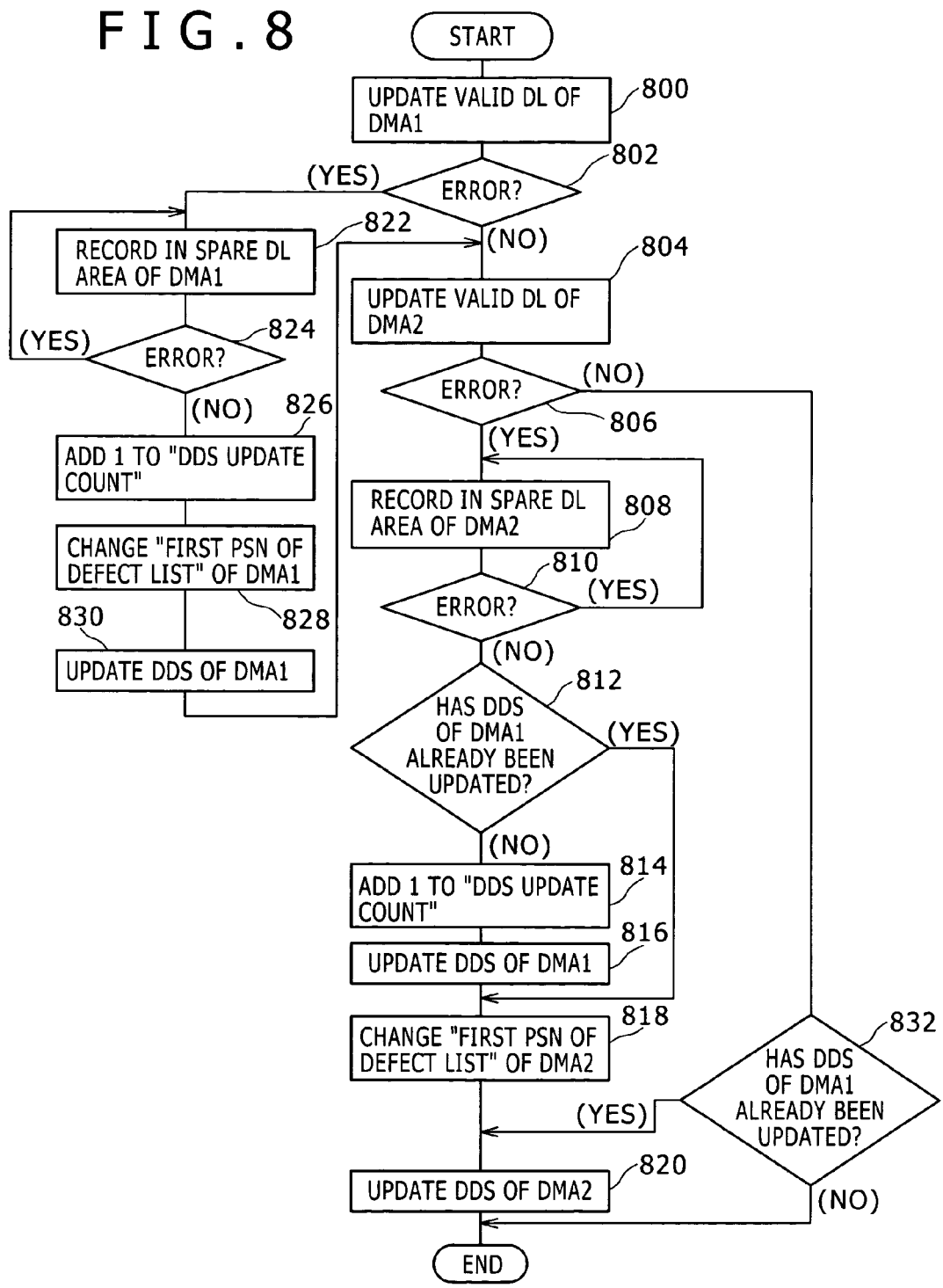
FIG. 8 is a flowchart of the DL updating process in FIG. 2 in the optical disk apparatus.

Next, procedures of the updating method for the disc definition structure in the optical disk apparatus will be described in detail with reference to FIGS. 8 and 9. FIG. 8 is a flowchart of the updating method shown in FIG. 2, and the flowchart is executed by the microprocessor 6 after the user data fails to be recorded in the address (a) of the user data area and the valid DL of DMA1 is updated (Step 800, (3) in FIG. 2). After it is checked in Step 802 whether or not the update in Step 800 shows an error, if no error is present, the flow proceeds to Step 804 to update the valid DL of DMA2. After it is checked in Step 806 whether or not the update in Step 804 shows an error, if the error is detected ((4) in FIG. 2), the DL is recorded (replacement process) in a spare DL area ((5) in FIG. 2) of DMA2 in Step 808. After it is checked in Step 810 whether or not the replacement process shows an error, if the error is detected, Step 808 and Step 810 are repeated. If the error is not detected, or has not finally been detected in Step 810, the flow proceeds to Step 812 to check whether or not the DDSs of DMA1 have been updated. Since the DDSs of DMA1 have not been updated yet, the flow proceeds to Step 814 to add 1 to the information of "DDS update count" of the four DDSs of DMA1 loaded in the buffer memory 8. Next, the four DDSs of DMA1 of the optical disk are updated in Step 816 ((6) in FIG. 2). Then, the flow proceeds to Step 818 to move (seek) the pickup 3 to the outer circumference so as to change the information of "first PSN of defect list" of the four DDSs of DMA2 loaded in the buffer memory 8. Then, the four DDSs of DMA2 of the optical disk are updated in Step 820 ((7) in FIG. 2).

If the error is detected in Step 802, the flow proceeds to Step 822 to record (replacement process) the DL in a spare DL area of DMA1. After it is checked in Step 824 whether or not the replacement process shows an error, if the error is detected, Step 822 and Step 824 are repeated. If the error is not detected, or has not finally been detected in Step 824, the flow proceeds to Step 826 to add 1 to the information of "DDS update count" of the four DDSs of DMA1 loaded in the buffer memory 8. Then, the flow proceeds to Step 828 to change the information of "first PSN of defect list" of the four DDSs of DMA1 loaded in the buffer memory 8. Then, the four DDSs of DMA1 of the optical disk are updated in Step 830. Thereafter, the flow proceeds to Step 804. In the case of this process, since the DDSs of DMA1 have already been updated in Step 812, the flow proceeds to Step 818. If the valid DL of DMA2 is successfully updated and thus no error is detected in Step 806, the flow proceeds to Step 832 in which the update of the DDSs of DMA1 is confirmed, and then the process is completed.

The case of this process causes a problem that much time is required for updating all the DMAs as described above. Especially in a normal continuous-recording process from an upper-level apparatus (host), when a defect is detected at the time of recording data and the data is alternatively recorded in a spare area; and further an error occurs at the time of updating a DL and the DL is alternatively recorded in a spare area, a large time loss is incurred as compared to normal recording and reproducing.

Figure 9:
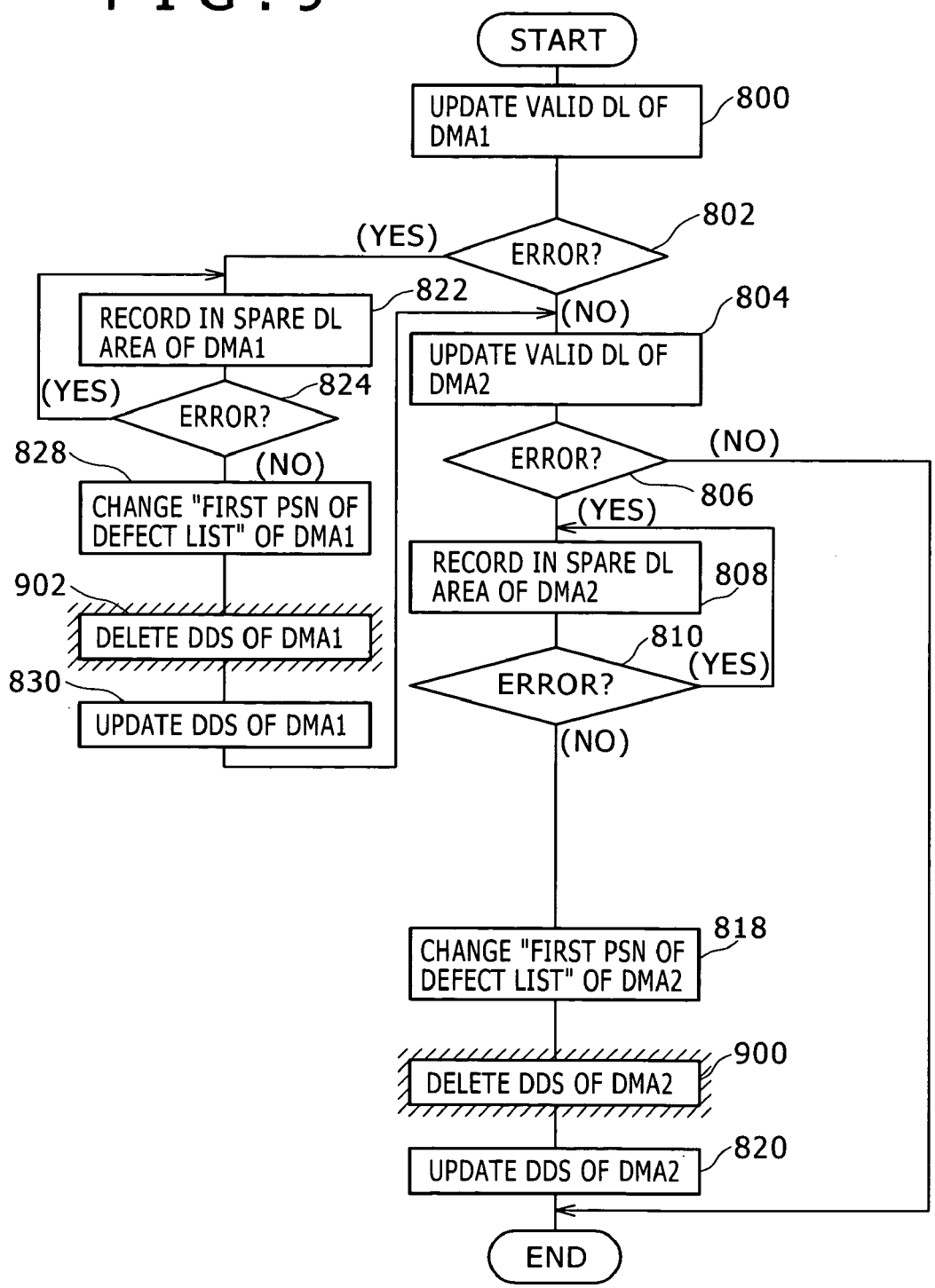
FIG. 9 is a flowchart of the DL updating process according to the embodiment in FIG. 4 in the optical disk apparatus.

FIG. 9 is a flowchart showing a concrete process of the updating method in the optical disk apparatus according to the embodiment shown in FIG. 4. Step 800 to Step 810 are the same as those shown in FIG. 8. If the DL is successfully recorded in the spare DL area of DMA2 in Step 810 ((5) in FIG. 4), only the information of "first PSN of defect list" of the four DDSs of DMA2 that is loaded in the buffer memory 8 is changed in Step 818 without performing the processes ((6) in FIG. 2) in Steps 812, 814, and 816 in FIG. 8. Next, the four DDSs of DMA2 of the optical disk are deleted in Step 900 ((9) in FIG. 4), the four DDSs of DMA2 of the optical disk are updated on the basis of the DDSs in the buffer memory that were already changed in Step 820 ((10) in FIG. 4). If the error is detected in Step 802 and the replacement recording in the spare DL area of DMA1 succeeds (Step 824), only the information of "first PSN of defect list" is changed in Step 828 without updating the information of "DDS update count". Then, the four DDSs of DMA1 are deleted in Step 902, and the four DDSs of DMA1 of the optical disk are updated in Step 830. If the replacement process for the valid DL area of DMA2 of the optical disk is successfully performed in Step 804, the process is completed without confirming the update of the DDSs of DMA1.

As described above, according to the embodiment, when a defect is detected at the time of recording user data and the data is alternatively recorded in a spare area; and further a DL also fails to be updated, the DDSs of the DMA in which the DL fails to be updated are deleted without updating the information of the number of times of updating the DDSs of all the DMAS, and only the DL starting address of the DDSs of the DMA in which the DL fails to be updated is changed for update, thus reducing the number of times of updating the DDSs. A laser power necessary for the deleting process is lower than that required for recording, thus realizing reduction in the number of times of updating the DDSs as well as in wasting of the rewriting capacity of the disk. Further, since the seek operation from the inner circumference to the outer circumference on the disk can be reduced at the time of updating a DL, the time required for update can be shortened. Further, since the information of the number of times of updating the DDSs is not updated, there is no possibility of producing a disk that violates the standard. Furthermore, when a large time loss is incurred at the time of updating a DL, there is a possibility of cutting off from the host due to a failure of a recording process that is caused by an overtime in time monitoring of a recording command issued by the host, however, such an event can be avoided according to the embodiment.

What is claimed is:

1. An information recording/reproducing apparatus, comprising:
    a spindle motor for rotating an optical disk medium on which management information is recorded in each of a plurality of areas that are separately arranged in a radius direction, the management information including at least a first and a second defect list composed of defect position information and spare position information, and a disc definition structure composed of starting position information indicating a starting position at the first defect list or the second defect list and information of the-number-of-times-of-updates;
    a pickup for recording, reproducing or deleting information on the optical disk medium;
    a recording/reproducing/deleting circuit for processing a recording signal and a deleting signal that are supplied to the pickup and for processing a reproduced signal from the pickup;
    a servo circuit for controlling rotation of the spindle motor and movement of the pickup;
    a memory for storing recording information that is supplied to the recording/reproducing/deleting circuit and for storing reproduced information that is processed by the recording/reproducing/deleting circuit; and
    a microprocessor for controlling the servo circuit and the recording/reproducing/deleting circuit,
    wherein the second defect list is used as a spare area for the first defect list of identical management information,
    wherein when information fails to be recorded on the optical disk medium and a replacement process is performed; and the defect list of first management information that is recorded on an inner circumferential side of the optical disk medium is updated and then the first defect list of second management information that is recorded on an outer circumferential side than the first management information fails to be updated, the second defect list of the second management information is updated and then the disc definition structure of the second management information is deleted, and the starting position information of the defect list included in the disc definition structure of the second management information is changed for update.

2. The information recording/reproducing apparatus according to claim 1, wherein the updated information of the-number-of-times-of-updates included in the disc definition structure of the second management information is the same as that in the last time.

3. The information recording/reproducing apparatus according to claim 1, wherein when the starting position information of the defect list is changed, the starting position information of the defect list included in the disc definition structure of the second management information that is stored in the memory is changed, and when the disc definition structure of the second management information is updated, the disc definition structure of the second management information on the optical disk medium is updated on the basis of the changed disc definition structure of the second management information stored in the memory.

4. An updating method of management information for an optical disk medium on which management information is recorded in each of a plurality of areas that are separately arranged in a radius direction, the management information including at least a first and a second defect list composed of defect position information and spare position information, and a disc definition structure composed of starting position information indicating a starting position at the first defect list or the second defect list and information of the-number-of-times-of-updates, the method comprising the steps of:

storing, after a plurality of pieces of management information for the optical disk medium are reproduced, the reproduced information;

performing, when information fails to be recorded on the optical disk medium, a replacement process for recording the same information in a spare area, wherein the second defect list is used as a spare area for the first defect list of identical management information;

updating the defect list of first management information that is recorded on an inner circumferential side of the optical disk medium;

changing the starting position information of the first defect list included in the disc definition structure of the second management information that is stored in the memory when the defect list of second management information that is recorded on an outer circumferential side than the first management information of the optical disk medium fails to be updated and the replacement process is performed;

updating the second defect list of the second management information;

then deleting the disc definition structure of the second management information of the optical disk medium; and recording the updated disc definition structure of the second management information, which is stored in the memory, on the optical disk medium.

5. The updating method of management information for an optical disk medium according to claim 4, wherein the updated information of the-number-of-times-of -updates, which is recorded on the optical disk medium, included in the disc definition structure of the second management information is the same as that in the last time.

* * * * *